Feb. 26, 1924.
S. P. TAYLOR
1,484,803
CULTIVATOR
Filed Jan. 18, 1922 2 Sheets-Sheet 1
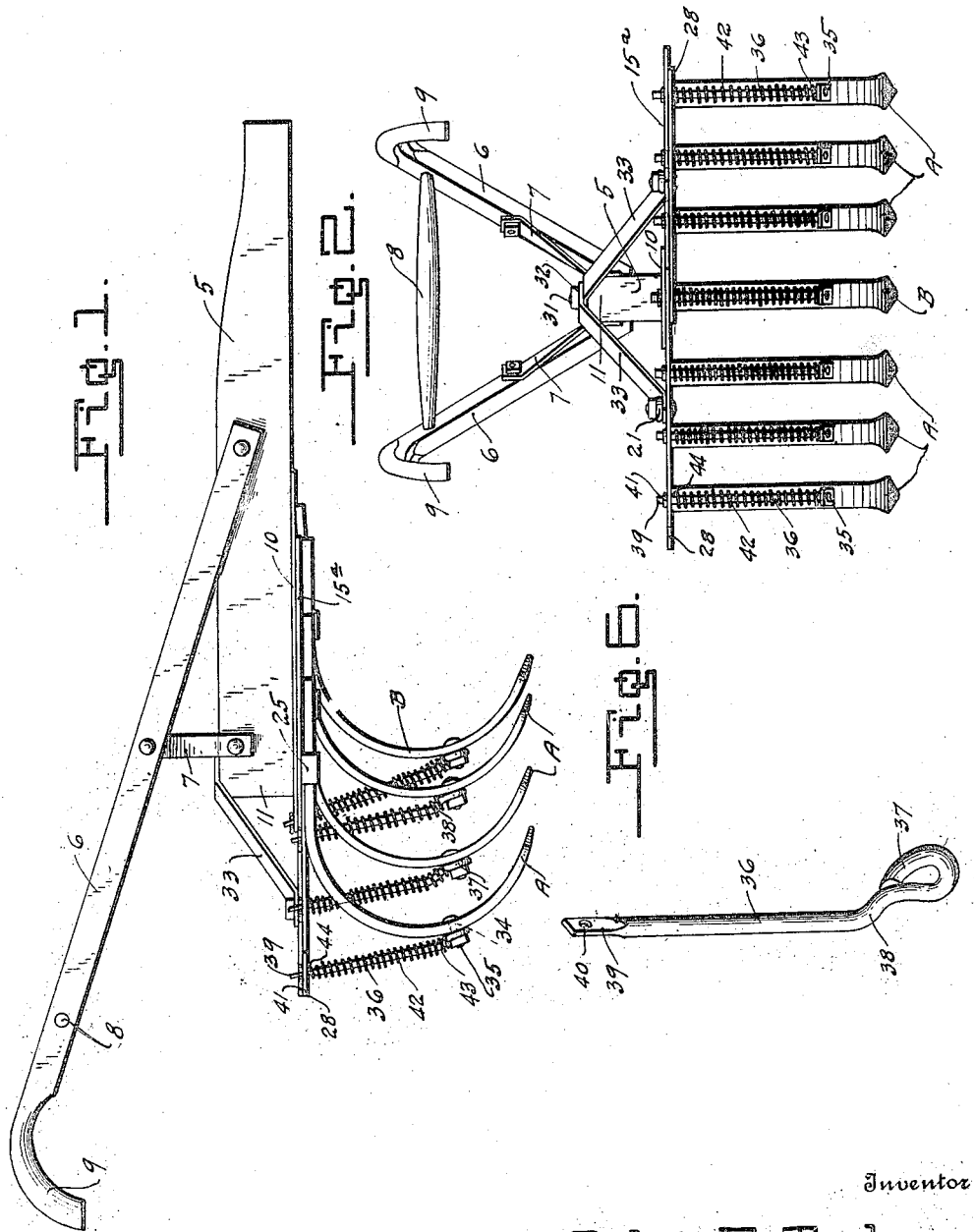
Inventor
Silas P. Taylor

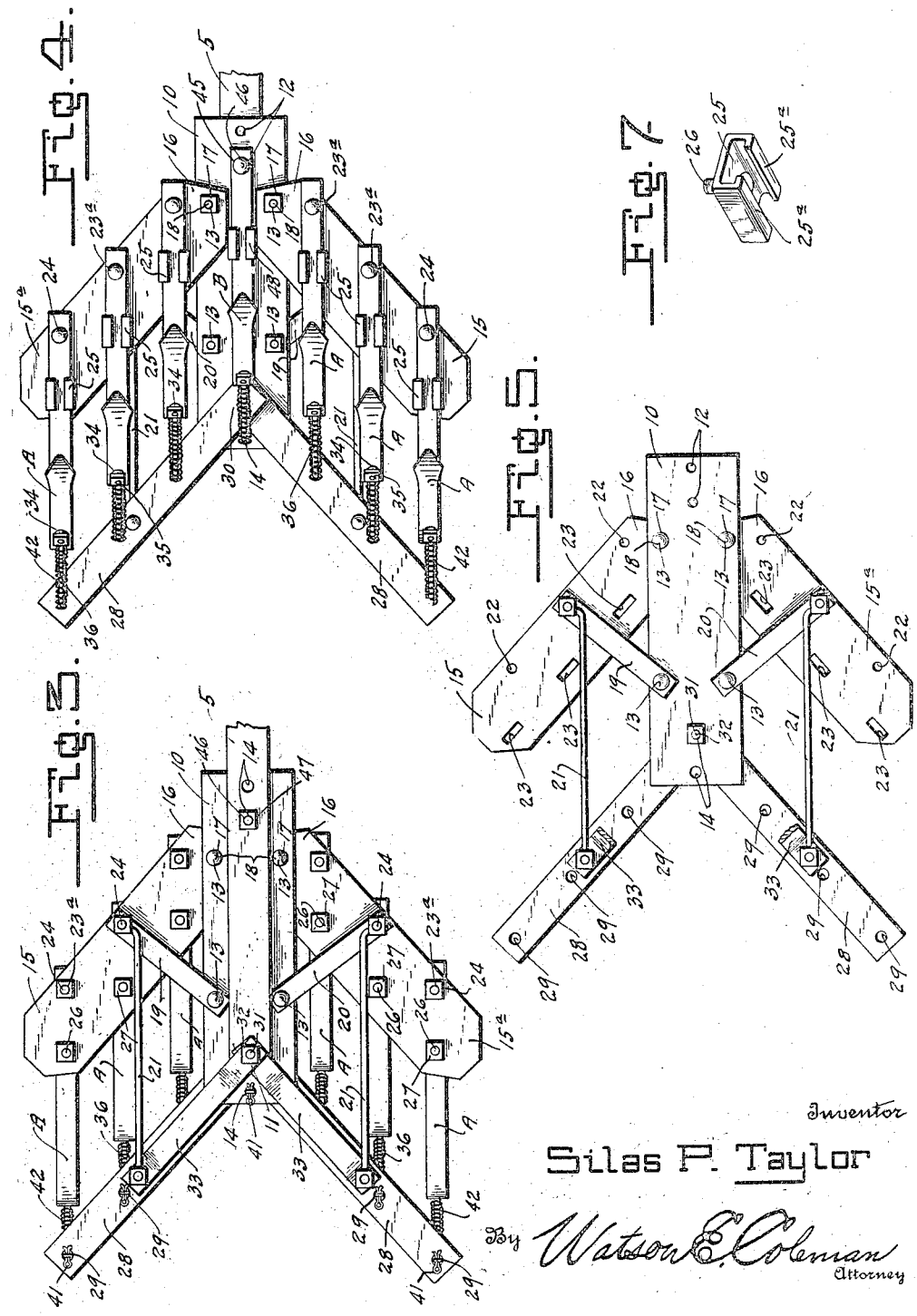

Patented Feb. 26, 1924.

1,484,803

UNITED STATES PATENT OFFICE.

SILAS P. TAYLOR, OF LORETTO, TENNESSEE, ASSIGNOR TO DAVID E. SUTHERLAND, OF HALEYVILLE, ALABAMA.

CULTIVATOR.

Application filed January 18, 1922. Serial No. 530,117.

*To all whom it may concern:*

Be it known that I, SILAS P. TAYLOR, a citizen of the United States, residing at Loretto, in the county of Lawrence and State of Tennessee, have invented certain new and useful Improvements in Cultivators, of which the following is a specification, reference being had to the accompanying drawings.

This invention relates to cultivators and has for its object to provide a cultivator having adjustable cultivating implements or teeth.

It is another object of the invention to provide a cultivator of this character wherein each tooth is provided with means for bracing or cushioning the same so that the strain incident to the contact of the tooth with an obstruction is absorbed by the bracing means.

It is also an object of the invention to provide a cultivator of this character, having supporting members to which the cultivating implements are connected, each implement being capable of adjustment with respect to the supporting member to dispose the teeth closely adjacent or away from each other.

It is a further object of the invention to provide a cultivator of this character wherein holding members are carried by the cultivator with which the bracing members are engaged, said bracing members being simultaneously adjustable with the teeth without requiring disengagement of said members from the holding members.

It is still a further object of the invention to provide a cultivator of this character including a beam, and supporting members carried by the beam, the cultivating implement carried by the intermediate supporting member being movable independently of the remaining cultivating teeth so as to permit the cultivator to straddle a row.

With these and other objects in view, the invention consists in the improved construction and arrangement of parts to be hereinafter more particularly described, fully claimed and illustrated in the accompanying drawings, in which:—

Figure 1 is a side elevation of the cultivator;

Figure 2 is a rear elevation of the cultivator;

Figure 3 is a top plan view of the cultivator;

Figure 4 is a bottom plan view of the cultivator;

Figure 5 is a plan view of the implement supporting means with the arms and cultivating implements removed;

Figure 6 is a perspective view of one of the bracing members; and

Figure 7 is a perspective view of one of the guides.

Referring to the drawings, 5 designates a beam of a cultivator to which a pair of handles 6 are connected, the handles being secured to the beam by means of braces 7, the usual brace 8 being disposed adjacent the hand grip 9 of the handle.

Secured to the lower face of the beam 5 is a supporting member or plate 10, said plate being relatively long so as to extend from the central portion of the beam to a point beyond the rear end portion 11 of the beam. The plate 10 is also wider than the beam so that the longitudinal edges of said plate project beyond the side faces of the beam. The forward end of the plate 10 is provided with a pair of spaced openings 12, while the longitudinal edges of said plate are also provided with spaced openings 13, spaced openings 14 being provided at the rear end portion of the plate.

In connection with the supporting member or plate 10, auxiliary supporting members or plates 15 and 15ª are provided, the end 16 of each of said plates being substantially tapered and provided with an opening 17 adapted to register with the forward opening 13 in the longitudinal edge of the plate 10, a bolt 18 being passed through said registering openings to connect the plate to the plate 10. The auxiliary supporting member or plate 15 projects from one side of the plate 10, while the auxiliary supporting member or plate 15ª projects from the opposite side, each of said plates being extended toward the rear end of the beam. Braces 19 and 20 are connected at one of their ends by means of bolts passed through said braces and the remaining openings 13 of the plate 10, the opposite ends of said braces being connected to the forward longitudinal edges of the auxiliary supporting members or plates 15 and 15ª. Auxiliary braces 21 are also connected to the auxiliary supporting members 15 and 15ᵃ by means of bolts which connect the ends of the braces 20 to said auxiliary supporting members, the opposite ends of the auxiliary braces 21 extending rearwardly and beyond the free end portion of the supporting member or plate 10. Each of the auxiliary supporting members or plates 15 and 15ᵃ is provided with a series of openings 22 which are disposed at the forward longitudinal edge of the plate, while extending along the rear longitudinal edge of the plate is a series of slots 23, the slots being disposed in staggered relation to the openings 22. A plurality of cultivating implements such as shovels, or teeth, A are provided, one end of each implement having an opening 23ᵃ adapted to receive a bolt 24, the bolt passing through one of the openings 22. Slidable on each of the teeth A is a guide member 25, said guide member being substantially U-shaped in cross section and having flanges 25ᵃ whereby the guide member is caused to embrace the shank of the tooth. Projecting from the guide 25 is a bolt 26, said bolt being adapted to extend through one of the slots 23 and provided with a nut 27 so that the guides may be adjusted longitudinally of the plates 15 and 15ᵃ in view of the elongated slots 23. This permits each tooth to be adjusted to suit the various needs of agricultural work and at the same time, the nuts 27 may be tightened so as to rigidly hold the teeth in their adjusted positions.

It has been found that when a cultivator tooth of the character described comes in contact with a root or boulder the same is subjected to great strain and frequently damaged to an extent that it must be removed, thus causing delay in the plowing or cultivating operation. To overcome this disadvantage there is provided novel cushioning or bracing means comprising a pair of holding members 28, each having a series of openings 29 extending longitudinally and centrally. The end portion 30 of each holding member is adapted to overlap to cause registration of the end openings. A bolt 31 is passed through said registering openings and the forward opening of the openings 12 provided in the plate 10. The bolt 31 extends through the beam and has a nut 32 engaged therewith for firmly securing the end of the plate 10 and said ends of the holding members to the beam. A pair of braces 33 have their corresponding ends bolted to the intermediate portion of the holding members by bolts passed through one of the openings 29 in each holding member, while the opposite ends of the braces are disposed in overlapping relation to permit the openings provided in said ends to register and to receive the end of the bolt 31 so that in this way, the holding members, as well as the rear portion of the supporting member or plate 10, is firmly braced and fastened to the beam of the cultivator.

Each of the teeth A is provided with an opening 34 adjacent the ground engaging end thereof, said opening being adapted to receive a bolt 35. A bracing rod 36 is provided, the end portion 37 of said rod being coiled to form an eye for the reception of the bolt 35, said eye being offset as at 38 with respect to the major portion of the rod so as to position said rod substantially in spaced relation to the tooth A. The opposite end 39 of the rod is flattened and provided with an opening 40. The end portion 39 is adapted to extend through one of the openings 29 in the adjacent holding member 28, the opening 40 being arranged to receive a cotter pin 41 or like fastening means to prevent disengagement of the end portion 39 from the holding member.

Before the end portion 39 is passed through the holding member, a relatively long coil spring 42 is placed on the rod, the end portion 43 of said spring being adapted to engage the offset portion 38 of the rod, while the opposite end 44 of the spring is intended to engage the lower face of the holding member. In view of this novel arrangement, should any one of the teeth strike an obstruction such as a boulder or root, the rearward movement of the tooth will be cushioned through the medium of the spring 42, thereby preventing damage. At the same time, the flexing of the tooth will be resisted by the rod 36 guiding said tooth in its abnormal position through the medium of the holding member, the rod also serving to reinforce the tooth so that the amount of resistance offered is sufficient to prevent damage to the tooth, regardless of the size of the obstruction with which the tooth may come in contact. In view of the cotter pins 41, it is not possible for the spring to dispose the teeth out of alignment by urging one tooth forward to a greater extent than that desired.

In addition to the teeth A carried by the auxiliary supporting members 15 and 15ᵃ, a central tooth B is provided, said tooth similar to the teeth A having an opening 45 in one end thereof adapted to receive a bolt 46, said bolt passing through one of the openings 12 of the plate and through the beam 5, a nut 47 being engaged with the bolt and the upper face of the beam to not only clamp the teeth B to the plate, but the plate or supporting member 10 to the beam. A guide member 48, similar in construction to the guide members 25 is secured to the central portion of the supporting member or plate 10 for the reception of the shank of the teeth B. By the use of a series of openings 12, the tooth B may be adjusted inwardly or rearwardly with respect to the beam, or may be removed entirely so as to permit the cultivator to straddle a row. The tooth B similar to the teeth A is provided with bracing means, similar to the rod and spring of the teeth A, the rod of the tooth B extending through the rearmost opening 14 of the supporting member or plate 10. When the tooth B is removed, the rod of the tooth may also be removed, in view of the fact that it is possible to readily withdraw the cotter pin in the end of the rod and permit the same to be disengaged from the plate or holding member 10.

From the foregoing it will be readily seen that this invention provides a novel form of cultivator wherein the teeth may be adjusted by the operator and held in their adjusted position through the medium of the guide member. Furthermore the shocks and abnormal strain transmitted to the teeth are checked or absorbed by the novel bracing means so that regardless of the utility of the device, it is rendered substantial and will consequently last indefinitely.

What is claimed is:—

1. A cultivator of the character described comprising a beam, a supporting member carried by the beam, auxiliary supporting members carried by said first mentioned supporting member, holding members carried by the first mentioned supporting member in spaced relation to the auxiliary supporting members, cultivating implements carried by the auxiliary supporting members, means carried by said implements and engaged with the auxiliary supporting members for holding said implements in various adjusted positions, a rod connected to each of the implements remote from the portion of the implements connected to the auxiliary supporting members, said rod being movable through openings provided in the holding members, springs surrounding said rods and engaged with the lower face of the holding members, said holding members being adjustably connected to the first mentioned supporting member.

2. In combination with a cultivator comprising a beam, a supporting member carried by the beam, auxiliary supporting members carried by said first named supporting member, holding members carried by the first named supporting member in spaced relation to the auxiliary supporting members, resilient cultivating implements projecting from the auxiliary supporting members, rods pivoted at their lower ends to the cultivating implements, the upper ends of said rods being movable through openings provided in the holding members, said rods extending upwardly in divergent relation to the cultivating implements, springs carried by said rods, one end of each spring engaging the pivoted ends of the rod, the opposite end of the springs engaging the lower faces of the holding members whereby the movement of the entire structure of the cultivating implement is yieldably braced through the medium of the holding members urging each of the rods in a downward and forward direction through the medium of the springs.

3. In combination with a cultivating implement embodying a beam, a supporting member carried by the beam, auxiliary supporting members carried by the first named supporting members and extending in opposite oblique directions from the beam, holding members carried by the beam and extending in opposite oblique directions from the beam and substantially in parallel relation to the auxiliary supporting members, a plurality of resilient cultivating implements carried by the auxiliary supporting members, a portion of each of said members being longitudinally curved, said holding members having a series of openings, a rod pivoted at its lower end to the lower curved portion of each of the implements, the lower portion of each rod being offset, the upper ends of the rods being slidable through the openings in the holding members, a spring surrounding each rod, one end of the spring being adapted to engage the offset end portion of the rod, the opposite end of the spring being adapted to engage the lower face of the holding member, said rods extending upwardly and in divergent relation to the implement whereby the rearward flexing movement of the implement is resisted by a downward and forward thrust of the rods through the medium of the springs.

In testimony whereof I hereunto affix my signature.

SILAS P. TAYLOR.